United States Patent [19]

Meheus et al.

[11] Patent Number: 6,096,353
[45] Date of Patent: Aug. 1, 2000

[54] CALF MILK REPLACER

[75] Inventors: Elisa Margriet Maria Meheus, Ghent; Jos Willy Ghislain Corneel De Sadeleer, Holsbeek, both of Belgium; Mathijs Elbert Keij, Bunnik, Netherlands

[73] Assignee: Cerestar Holding B.V., La Sas van Gent, Netherlands

[21] Appl. No.: 09/239,783

[22] Filed: Jan. 29, 1999

[30] Foreign Application Priority Data

Jan. 29, 1998 [GB] United Kingdom .................. 9801835

[51] Int. Cl.⁷ ...................................... A23K 1/14
[52] U.S. Cl. ................ 426/53; 426/46; 426/54; 435/68.1
[58] Field of Search .................. 426/46, 53, 54, 426/656, 623, 630, 635, 443, 459; 435/68.1

[56] References Cited

U.S. PATENT DOCUMENTS

| | | | |
|---|---|---|---|
| 3,770,463 | 11/1973 | McSweeney et al. | 426/212 |
| 4,297,382 | 10/1981 | Hosaka | 426/656 |
| 5,138,038 | 8/1992 | Katayama et al. | 530/343 |
| 5,565,225 | 10/1996 | Johnston | 426/2 |
| 5,618,689 | 4/1997 | McCarthy et al. | 435/68.1 |

FOREIGN PATENT DOCUMENTS

| | | |
|---|---|---|
| 1 071 923 | 2/1980 | Canada . |
| 446 987 | 11/1993 | European Pat. Off. . |
| 2 634 624 | 2/1990 | France . |
| 30 03 679 | 8/1981 | Germany . |
| 41 16 744 | 11/1992 | Germany . |
| 1 519 164 | 7/1978 | United Kingdom . |

OTHER PUBLICATIONS

Chemical Abstract, vol. 82, No. 15, Apr. 14, 1975 Columbus, Ohio, US; Abstract No. 96812h., P.K. Lee et al " Feeding Tiochentofen as a substitute for dried skim milk in the nutrition of early weaning pigs" p. 346; col. 1; XP002074952 & T' Ai–Wan Nung Yeh Chi K'an vol. 10, No. 3, 1974, pp. 69–76.

*Primary Examiner*—Keith D. Hendricks
*Attorney, Agent, or Firm*—Pillsbury Madison & Sutro LLP

[57] ABSTRACT

The invention relates to a composition useful as a protein source for a milk replacer in animal feed. Specifically, the milk replacer is used for pre-ruminant and young ruminant calves, suckling piglets and suckling lambs. The composition consists of a combination of hydrolyzed soya proteins and hydrolyzed wheat gluten. Furthermore, a method is disclosed for obtaining the composition. A process for enhancing animal growth by feeding animals with a milk replacer containing the said composition is also disclosed.

12 Claims, No Drawings

CALF MILK REPLACER

TECHNICAL FIELD

The present invention relates to a composition useful as a protein source for use in a milk replacer for animal feed. Specifically, the milk replacer is used for pre-ruminant and young ruminant calves, suckling piglets and suckling lambs. The composition consists of a combination of hydrolysed soya proteins and hydrolysed cereal proteins. A method for obtaining the said composition is also disclosed. The invention further discloses a process for enhancing animal growth by feeding animals with a milk replacer containing the said composition.

BACKGROUND OF THE INVENTION

The products of the present invention mainly find application in feeding of young farm animals, especially young ruminants however, other animals like pets are not excluded. Young calves, lambs and pigs depend on mother's milk to provide nourishment during the period when the rumen and other digestive functions have not yet developed. Young animals are therefore unable to utilise the feed consumed by adult animals. For calves this period comprises two stages.

The first is the so-called pre-ruminant stage i.e. when the digestive functions are more akin to those of monogastric animals. During the second stage the rumen is developing but is not yet capable of fully performing the animals needs. Depending on the type of food offered and the intended use of the animals the pre-ruminant stage may be shorter or longer. Because of the high costs and inconvenience of feeding liquid cow's milk, artificial milk replacers have been developed. Milk replacers contain the following ingredients; milk proteins, fat, carbohydrates, vitamins and minerals. Milk proteins generally used are whey proteins and dried skim milk powder manufactured from cow's milk.

The physico-chemical and nutritional characteristics of the milk proteins have been shown to be of such a nature that replacement with other proteins gives rise to a lot of problems. When artificial milk replacers are made the finished feed product contains a series of components and care should be taken that the mixture has the right dispersibility, suspendibility in water, solubility and fat-binding ability. Moreover, care has to be taken that the color, taste and smell are acceptable.

The supply and costs of skimmed milk powder make it attractive to try to find other protein sources for pre-ruminant or young ruminant feed purposes. A lot of effort has been spend on trying to find or develop suitable protein sources for example, efforts have been made to develop products starting from soya bean meal, from fish meal, and from microbial sources such as yeasts. It has turned out that the finding of a suitable alternative protein source is not a straightforward process. In particular problems have occurred with the solubility and suspendibility of products, moreover inadequate growth due to the presence of anti-nutritional factors and low feed conversion has often been observed. In addition when starting from meal or flour the product normally would contain starch and fats. In order to avoid this additional processing steps are required which include degradation of the mentioned unwanted products and purification.

British patent GB 1,519,164 discloses a process for preparing a vegetable protein concentrate for use in feeding young animals which comprise acid hydrolysis of a first batch of finely ground vegetal flour, alkaline hydrolysis of a second batch of the same vegetal flour material, mixing the hydrolysates and drying the mixture.

European patent EP 0 479 596 B discloses a process for treating sources of vegetable protein and carbohydrate comprising, preparing an aqueous slurry of vegetable proteins and carbohydrates; adjusting the pH of the slurry between 3.5 and 6; pretreating the slurry with a viscosity reducing agent (an enzyme or an anti-oxidant); heating the slurry; cooling and hydrolysing with a hydrolysing agent from a source of alpha-galactosidase.

U.S. Pat. No. 5,565,225 relates to a modified soy flour/wheat feed (MSWF). Such a product is obtained by mixing soy flour and wheat flour, gelatinising the starch and reacting the mixture with an effective amount of malted grain.

U.S. Pat. No. 5,138,038 discloses protein partial degradation products obtainable from grain proteins by specific degradation treatment. The products are useful as quality improving agents for various food stuffs, as surface active agents and as dispersing agents for particles.

German patent application DE 4116744 relates to an enzymatic process for obtaining spices from soya meal or wheat proteins.

From the above references and in the general literature it appears that vegetable proteins are considered as an interesting protein source because they are cheap and available in large quantities. Among the vegetable proteins soya proteins and cereal proteins have been considered.

A major drawback of the use of high amounts of soya proteins in milk replacers is that soya contains a large amount of anti-nutritional factors which severely restricts their potential use. Recently, wheat protein has been introduced on the market for replacing milk proteins. Both soya and wheat proteins however show a limited potential for inclusion in milk replacers instead of skimmed milk powder, especially when they are used in untreated form. Addition of these proteins results in decrease of feed conversion due to inefficient protein digestion.

In an attempt to use mixtures of soya and cereal proteins it appeared that mixtures of these proteins are not physically stable and give rise to unstable suspensions. Soya protein concentrate itself also does not give good and stable suspensions in water, the protein precipitates in less than 10 minutes. A further drawback of the use of soya proteins is the large amount of anti-nutritional factors.

The present invention solves the stability problems of the protein suspensions while at the same time a considerable reduction of the anti-nutritional activity of the soya protein is observed in the young animals.

SUMMARY OF THE INVENTION

The present invention discloses a process for preparing a composition for use as a protein source in dairy milk which process comprises, preparing an aqueous slurry of vegetable proteins, hydrolysing the proteins and optionally, drying the protein hydrolysate. More specifically, the process comprises preparing a slurry of soya protein and a cereal protein preferably wheat gluten. In more detail the process comprises the following steps:

a) a slurry of a soya protein and wheat gluten is prepared of up to 30% dry substance,
b) the pH of the slurry is adjusted,
c1) a proteolytic enzyme or a mixture of proteolytic enzymes is added or,
c2) the temperature is increased to a temperature of between 85 and 155° C.,
d) proteolysis is allowed to proceed for the time needed to reach a degree of hydrolysis (DH) between 7 and 10%, and optionally,
e) the proteolytic product of step d) is dried.

The present invention also discloses a composition for the preparation of an artificial dairy milk replacer comprising a combination of hydrolysed soya protein and hydrolysed cereal protein. Preferably, the soya protein and cereal protein are mixed prior to hydrolysis. Preferably the cereal protein is derived from barley, corn, oats, rye sorghum or wheat, more preferably wheat protein is used.

The present invention also discloses a dairy milk replacer comprising the said composition. An animal feed composition is disclosed comprising carbohydrates, fat, and proteins characterised in that the protein is at least partially a mixture of hydrolysed soya protein and hydrolysed cereal protein.

DETAILED DESCRIPTION OF THE INVENTION

The present invention discloses that blending a cereal protein and a soya protein concentrate prior to hydrolysis and drying, results in a product superior to a simple dry mix of soya and cereal protein when used in dairy milk replacement applications.

The product of the present invention has good nutritional and physico-chemical properties. Due to these characteristics it is possible to increase the level of inclusion of soya and cereal protein in dairy milk formula. The product has the following improved properties when compared with a product resulting from separate hydrolysis of the soya and cereal protein.

1. nutritional properties
   low level of anti-nutritional factors
   optimal amino acid composition, adaptable by changing the ration of the components or by addition of specific amino acids
   good digestability
2. physico-chemical properties
   increased solubility
   improved dispersability
   increased suspension stability in water and calf milk replacement formula (CMR)

The process for preparing the composition of the present invention starts with the preparation of the protein mixture. The blend is prepared by first re-dispersing dry cereal protein and dry soya protein powder in water to produce a slurry of about 30% dry substance. Depending on the proteins used the dry substance value may be different, in general the value is chosen in such a way that the viscosity does not become too high while at the same time the dilution should not be too big as this would result in a large volume. Subsequently, an enzyme or enzyme mixture is added. Alternatively the enzymes may already be present in the water.

As a cereal protein (vital) wheat gluten are used in the present examples. Another possibility for preparing the slurry is then to start from wet (vital) gluten removed from the starch separation process and add enzymes, dry soya protein concentrate and extra water to produce a 30% d.s. slurry.

The hydrolysis of the proteins or protein mixture of the present invention is performed by acid or enzymatic hydrolysis. In case of acid hydrolysis the solution is acidified to a pH below 3 and heated for a sufficient amount of time to hydrolyse the protein. In enzymatic hydrolysis the protein solution is brought to a temperature and pH which are adapted to the type of enzyme used. In general this is indicated by the enzyme supplier.

The hydrolysis is followed by determining the degree of hydrolysation. The hydrolysation is allowed to proceed until a DH of between 7 and 10%, preferably between 7.5 and 9%.

The enzymes used for the present hydrolysis are hydrolases generally proteases. Suitable enzymes include Alkalase™, Neutrase™ etc. It is also possible to add transglutaminase.

The cereal protein which is used according to the present invention is selected from the group comprising wheat, barley, rye, oats, sorghum and corn. Wheat proteins are preferred.

The second protein is selected from the group comprising soya, rapeseed and sunflower. Soya proteins generally available in the form of (non-hydrolysed) soya protein concentrate are preferred.

The proteins which are selected from the mentioned groups are mixed in various amounts the ratio being from 10:90 to 90:10, preferably from 25:75 to 75:25, more preferably from 40:60 to 60:40, the most preferred being a ratio of 50:50. The ratio, which is actually employed is determined by the fact that it should give the required physical stability. It should however be kept in mind that the amino acid ratio will differ with the ratio of the proteins used due to the different amino acid composition of the individual proteins. In order to arrive at a desired amino acid composition the ratio between the two groups of proteins is adapted. It is also possible to add individual amino acids or an amino acid mixture to optimise the amino acid composition. Such an addition is done either before or after hydrolysis. It is especially important to optimise the amino acid composition when feed is prepared for pre-ruminant or suckling animals. In general the composition of the feed for these animals is continuously adapted during the first few weeks of their lives.

The hydrolysed protein mixture of the present invention is used to replace at least a part of the protein found in animal feed products, especially feed for pre-ruminant or suckling animals. The protein which is normally used in the milk replacer and which is to be at least partially replaced with the product of the present invention, is skimmed milk powder, whey powder, or whey powder concentrate. The protein is normally present in an amount of up to 22% (w/w) preferably about 18–22%.

To replace this between 2 and 30% of the hydrolysed protein mixture of the present invention is used in the final feed preparation.

Example 1 illustrates the preparation of a mixture of hydrolysed proteins according to the present invention. A blend of, in this case, vital wheat gluten and soya protein concentrate was mixed in a ratio of 1:1 and dispersed in water at a temperature of 55° C. and a mixture of Alkalase and Neutrase was added. Hydrolysis was performed during 2–2.5 hours and was followed by determination of the dregree of hydrolysis. The hydrolysis was stopped when a DH of 8% was reached. After hydrolysis the product was spray dried to a desired final moisture content of 5 to 6%. The final product was a soluble concentrate containing 75% protein on a dry basis. The suspension in water was more stable than that of soya protein. Due to the amino acid composition the product was suitable as a milk protein replacer in artificial calf milk. From an analysis of the composition of the product it was found that the level of anti-nutritional factors was low, glycinin and β-conglycicin were almost absent. This low level of anti-nutritional factors was confirmed in the feed trial experiment (Example 4).

In Example 2 mixtures were prepared with different ratios of wheat protein and soya protein. It was found that nitrogen solubility decreased with increasing soya protein content whereas dispersability and powder flowability increased. Soya protein reduces the foaming of wheat protein and gives a creamy color to the powder. Suspension stability in water was good for the blends with high level of wheat protein, and acceptable for the intermediate mixtures.

In Example 3 it was determined that the soya protein concentrate consisting of coarser granules (99% smaller than 80 μm) gave the same advantageous characteristics as the finer (99% smaller than 63 μm), more expensive, soya protein concentrate.

Example 4 reports the results of a calf feeding trial.

The CMR formulation containing the highest level of the blend gave the highest daily weight gain and thus the highest live weight per calf after 30 weeks and the lowest feed conversion factor (i.e. feed intake per kg weight gain). In fact the feed conversion factor showed an increase of two percent. It is expected that even higher values can be obtained after optimisation of the feed composition. When compared with soya protein concentrate or hydrolysed wheat gluten it appears that when these proteins are used separately, the daily weight gain decreases and the feed conversion ratio increases i.e. more feed is needed to obtain the same weight gain.

EXAMPLE 1

Co-hydrolysation of wheat protein and soya protein

A blend consisting of 50% vital wheat gluten and 50% soya protein concentrate on dry basis has been co-hydrolysed and spray dried.

A 30% dry substance blend was prepared batchwise by re-dispersing a dry mixture of vital wheat gluten and soya protein concentrate (ratio 1:1) in water at 55° C. The slurry was recycled by means of a centrifuge pump via a venturi for the addition of the dry powder.

The blend (30% d.s. and 55° C.) was then enzymatically hydrolysed to a degree of hydrolysis of about 8% by using the proteases Alcalase and Neutrase. The degree of hydrolysis (DH) was determined with the OPA method (Schmidt, D. G., Robben, A. J. P. M., *VMT,* 19, 13–15, 1993). The hydrolysis time needed to reach a DH of 8% depends on the enzyme concentration and on the other reaction conditions. In the present case 0.3% Alcalase and 0.2% Neutrase on dry substance was used to reach a DH of 8% in 2 to 2.5 hours.

To activate the enzyme and stop the hydrolysis reaction the pH was adjusted from 6.2 to about 4.5 by adding 10% HCl solution.

After hydrolysis the blend was supplied to a spray dryer and dried to a moisture content of about 5 to 6%. In this dryer the material is sprayed in the form of small droplets into a cylindrical vertical chamber into which a large volume of hot gas is fed. Coarse dried particles are separated from the cooled gas at the bottom of the chamber whereas finer particles are separated from the gas in external cyclones. All particles are collected in the fluid bed at the exit of the dryer where the product is cooled down before packaging.

The resulting product is a highly water soluble protein concentrate with a protein content of 75% on dry substance and a nitrogen solubility of about 50 to 55%. The suspension stability in water is better compared to (non-hydrolysed) soya protein concentrate, which settles down in less than 10 minutes.

The product has a low level of anti-nutritional factors; it is almost free from antigen (Glycinin<1.6 ppm and β-Conglycicin<0.8 ppm), has a low content of Trypsin inhibitors (<1 ppm) and a high content of highly digestible proteins. Since soya and wheat protein are rather complementary in view of their amino acid composition the 50/50 blend has the most optimal amino acid profile.

This protein combination is applied as skimmed milk replacer in calf feed as described hereunder in Example 4.

EXAMPLE 2

The influence of varying the soya/wheat protein ratio

Using the basic procedure outlined in Example 1 co-hydrolysed blends were produced containing different amounts of wheat protein. The following hydrolysed mixtures were prepared:

100% wheat protein and 0% soya protein
80% wheat protein and 20% soya protein
70% wheat protein and 30% soya protein
60% wheat protein and 40% soya protein
50% wheat protein and 50% soya protein
25% wheat protein and 75% soya protein
0% wheat protein and 100% soya protein Physical and nutritional properties of different co-hydrolysed protein mixtures are summarized in the following table:

| Product (ratio wheat/soya) | DH (%) | Moisture (%) | Protein N*6.24 (% on ds) | NSI PH 4.5 (%) | NSI pH 6.2 (%) | Antigen Glycinin (ppm) | Antigen B-conglyc. (ppm) |
|---|---|---|---|---|---|---|---|
| 100/0 | 7.6 | 4.5 | 85.4 | 71.7 | 68.7 | <1.6 | <0.8 |
| 80/20 | 8.0 | 5.5 | 83.6 | 71.0 | 68.4 | <1.6 | <0.8 |
| 70/30 | 8.4 | 5.8 | 80.9 | 64.7 | 63.9 | <1.6 | <0.8 |
| 60/40 | 7.7 | 6.4 | 79.7 | 61.6 | 61.7 | <1.6 | <0.8 |
| 50/50 | 8.5 | 5.7 | 78.6 | 55.2 | 57.2 | <1.6 | <0.8 |
| 25/75 | 7.3 | 5.4 | 73.0 | 51.7 | 47.8 | 2.1 | <0.8 |
| 0/100 | 7.1 | 5.0 | 68.7 | 42.9 | 44.8 | 6.0 | <0.8 |
| 0/100(*) |  | 7.7 | 71.5 | 4.4 | 5.5 | <1.6 | <0.8 |

(*)the last product is the non-hydrolysed soya protein concentrate

The higher the degree of hydrolysis the higher the nitrogen solubility, however taste can be negatively influenced when too much bitter peptides are formed (at high DH).

Nitrogen solubility (NSI) decreases with increasing soya protein content and is much higher for the hydrolysed blends than for the non-hydrolysed soya protein concentrate.

Dispersiblity and powder flowability increase with increasing soya content. Soya protein reduces the foaming of wheat protein and gives a creamy color to the powder.

Suspension stability in water is good for the mixtures with high wheat protein level and acceptable for the intermediate mixtures compared to non-hydrolysed soya protein. In the CMR formulation the suspension ability is very good for the whole range of hydrolysed blends.

Hydrolysis of pure soya protein concentrate increased the antigen titer of glycinin over normal level (6 ppm). The addition of only 25% wheat gluten before hydrolysis reduces it to the normal level (2.1 ppm).

When the physical and nutritional properties of the indicated mixtures are considered together with the amino acid compositions it can be concluded that the optimum ratio of soya protein to wheat protein is from 6:4 to 4:6.

EXAMPLE 3

Influence of granulometry of soya protein

The basic procedure from Example 1 was repeated using a coarser soya protein concentrate as raw material. Instead of soya concentrate with a granulometry of 99% smaller than 63 micron soya concentrate with a granulometry of 99% smaller than 80 micron was used. The resulting product had the same properties as the product prepared with finer (<43 micron), more expensive soya protein concentrate.

EXAMPLE 4

Calf feed trial using co-hydrolysed soya protein and vital wheat gluten

Because of its optimal amino acid composition and protein content, the 50/50 blend was selected to perform a calf feeding trial. The goal was to determine the effect of replacing part of the whey protein in a calf milk replacer by the 50/50 blend on feed intake, growth rate and feed conversion in breeds from 8 to 30 weeks of age. The 50/50 test product was prepared using the procedure described in Example 1.

The calf feeding trial was performed at the Provimi test farm in Veldriel, Netherlands on 60 black and white Holstein Friesian steer calves.

The calves were divided in three groups of 20 calves which were respectively fed a standard zero-product, a zero-product containing 7.5% of the 50/50 soya/wheat blend and a zero-product containing 11.7% of the blend.

From week 1 to 7 the calves were fed a starter diet containing only product with a skimmed milk powder content higher than 50%. From week 8 to 30 the calves were fed finisher diets containing CMR with more than 50% skimmed milk powder (SMP) and the zero-CMR products (without SMP). The ratio between CMR with and without skimmed milk powder in the finisher diets is as follows:

| CMR | Product with SMP >50% | Zero-product Without SMP |
|---|---|---|
| Week 8–12 | 80% | 20% |
| Week 13 | 60% | 40% |
| Week 14–18 | 50% | 50% |
| Week 19–30 | 40% | 60% |

The composition of the standard CMR with SMP and the standard and experimental zero-products without SMP are as follows (ingredients are given in kg/ton):

| CMR | Product with | Zero-product without SMP | | |
|---|---|---|---|---|
| Diet (kg/ton) | SMP >50% | Standard | Test 1 | Test 2 |
| Skimmed milk powder | 505 | — | — | — |
| Whey powder | 260 | 652 | 669 | 626 |
| Delactosed whey powder | — | 80 | — | — |
| Fat blend | 188 | 206 | 207 | 206 |
| Wheat protein | — | 16 | — | — |
| L-Lysine | — | — | 1.22 | 2.28 |
| DL-Methionine | — | — | 0.31 | 0.54 |
| L-Threonine | — | — | 0.83 | 1.46 |
| L-Tryptophan | — | — | 0.04 | 0.10 |
| 50/50 soya/wheat blend | — | — | 75 | 117 |
| Choline chloride 75% | 0.63 | 0.63 | 0.63 | 0.63 |
| Vitamin Premix | 10 | 10 | 10 | 10 |
| Mineral Premix | 36 | 36 | 36 | 36 |

Test 1 and Test 2 are the experimental zero-products containing respectively 7.5% and 11.7% of the 50/50 soya/wheat blend. To adapt the amino acid balance of the test products to the amino acid balance of milk protein small quantities of Lysine, Methionine, Threonine and Tryptophan were added to Test 1 and Test 2. The crude protein levels of the standard, Test 1 and Test 2 zero-products are respectively 12.7%, 15.4% and 18%.

The technical results of the feeding trials with 60 black and white Holstein Friesian steer calves are summarized below:

| Zero-CMR | Standard | Test 1 | Test 2 |
|---|---|---|---|
| 50/50 soya/wheat blend (inclusion %) | — | 7.5 | 11.7 |
| Crude protein (%) | 12.7 | 15.4 | 18.0 |
| Number of calves | | | |
| 8 weeks | 14 | 20 | 16 |
| 30 weeks | 13 | 20 | 16 |
| losses (%) | 7.1 | 0.0 | 0.0 |
| CMR intake (kg/calf) | | | |
| Week 8–30 | 349.9 | 350.8 | 353.5 |
| Liveweight (kg/calf) | | | |
| Week 8 | 67.6 | 69.0 | 67.9 |
| Week 30 | 253.7 | 256.3 | 260.0 |
| Gain (gram/day) | | | |
| Week 8–30 | 1024 | 1037 | 1057 |
| Feed conversion ratio (kg CMR/kg gain) | | | |
| Week 8–30 | 1.90 | 1.89 | 1.86 |
| Carcass analysis | | | |
| Carcass weight (kg/calf) | 152.0 | 150.9 | 152.2 |
| Ratio slaughter/live weight (*100) | 60.0 | 58.8 | 58.5 |
| Type(*) | 10.7 | 10.9 | 11.2 |
| Color(**) | 5.2 | 4.8 | 4.9 |
| Fat score(***) | 2.75 | 2.63 | 2.80 |

(*)on a 1–15 scale, 1 is best
(**)on a 1–10 scale, 1 is best
(***)on a 1–5 scale, 1 is best The CMR formulation containing the highest level of the blend gives the highest daily weight gain and thus the highest live weight per calf after 30 weeks and the lowest food conversion factor (i.e. feed intake per kg weight gain). These positive effects on gain and feed conversion were never found when replacing comparable amounts of whey protein by soya concentrate or wheat gluten in the CMR formulation.

Compared with the standard feed composition the addition of 11.7% of the composition of the present invention results in a two percent increase in feed conversion.

What is claimed is:

1. A process for preparing a composition containing hydrolyzed soya protein and hydrolyzed wheat gluten which comprises:
    a) preparing a slurry composition of a soya protein and wheat gluten containing up to 30% dry substance,
    b) adding acid or base to adjust the composition pH to the pH optimal for enzymatic activity of a pre-selected proteolytic enzyme or mixture of proteolytic enzymes,
    c) adding said proteolytic enzyme or said mixture of proteolytic enzymes,
    d) reacting until proteolysis of the soya protein and wheat gluten reaches a degree of hydrolysis (DH) between 7 and 10%, and
    e) drying the hydrolyzed product of step d).

2. A process according to claim 1 wherein the slurry of step a) comprises soya protein and wheat gluten in a ratio of from 60%:40% to 40%:60%.

3. A process according to claim 1 wherein the product of step d) is incubated to a degree of hydrolysis of between 7.5 and 9%.

4. A process according to claim 1 wherein the product of step d) is spray dried in step e).

5. A dairy milk composition comparing carbohydrates, proteins and fat wherein at least a part of the proteins comprise the composition obtained according to claim 1.

6. A dairy milk composition to claim 5 wherein the composition of claim 1 comprises hydrolysed soya protein and hydrolysed wheat gluten forming between 2 and 100% (w/w) of the proteins.

7. A process for preparing a composition containing the hydrolyzed soya protein and hydrolyzed wheat gluten, which comprises:
    a) preparing a slurry composition of a soya protein and wheat gluten having up to 30% dry substance;
    b) adding acid to the composition to adjust the composition pH to below 3;
    c) increasing the temperature of the composition to between 85 and 155° C.;
    d) reacting until proteolysis of the soya protein and wheat gluten reaches a degree of hydrolysis (DH) between 7 and 10% and
    e) drying the hydrolyzed product of step d).

8. A process according to claim 7, wherein the slurry of step a) comprises soya protein and wheat gluten in a ratio from 60%:40% to 40%:60%.

9. A process according to claim 7, wherein the product of step d) is incubated to a degree of hydrolysis between 7.5 and 9%.

10. A process according to claim 7, wherein the product of step d) is spray dried in step e).

11. A dairy milk composition comprising carbohydrates, proteins and fat wherein at least part of the proteins comprise the composition obtained according to claim 7.

12. A dairy milk composition according to claim 11, wherein the composition comprises hydrolyzed soya protein and hydrolyzed wheat gluten forming between 2 and 100% (w/w) of the proteins.

* * * * *